United States Patent [19]
Friedman et al.

[11] Patent Number: 5,893,090
[45] Date of Patent: Apr. 6, 1999

[54] METHOD AND APPARATUS FOR PERFORMING AN AGGREGATE QUERY IN A DATABASE SYSTEM

[75] Inventors: Paul Friedman, Hillsborough; Michael Smedberg, Berkeley, both of Calif.

[73] Assignee: Informix Software, Inc., Menlo Park, Calif.

[21] Appl. No.: 790,722

[22] Filed: Jan. 31, 1997

[51] Int. Cl.$^6$ .................................................. G06F 17/30
[52] U.S. Cl. ................................................ 707/3; 707/5
[58] Field of Search ............................ 707/3–5, 2

[56] References Cited

U.S. PATENT DOCUMENTS

| | | | |
|---|---|---|---|
| 5,379,422 | 1/1995 | Antoshenkov | 707/1 |
| 5,537,589 | 7/1996 | Dalal | 707/1 |
| 5,675,785 | 10/1997 | Hall et al. | 707/102 |

OTHER PUBLICATIONS

Jaideep Srivastava et al., "TBSAM: An Access Method for Efficient Processing of Statistical Queries," IEEE Transactions on Knowledge and Data Engineering, vol. 1, No. 4, pp. 414–423. dec. 1989.

Jaideep Srivastava et al., "A Tree Based Access Method (TBSAM) for Fast Processing of Aggregate Queries," 1988 4th Int'l Conference on Data Engineering, pp. 504–510. 1988.

Inoformix Software, Inc., "Informix–New Era Language Reference Version 1.0", Informix Press, pp. 4–14 to 4–16, Oct. 1994.

D.J. Rees, "Essential Statistics", Third edition, Chapman & Hall, pp. 24–35, 84–107, 1995.

E.S. Keeping, "Introduction to Statistical Inference", Dover Publications, Inc., pp.95–119, 1995.

C.J. Date, "An Introduction to Database Systems", Fifth Edition, Addison–Wesley Publishing, vol. 1, pp. 152–155, Feb. 1991.

*Primary Examiner*—Paul V. Kulik
*Attorney, Agent, or Firm*—Fish & Richardson P.C.

[57] ABSTRACT

In a computer-implemented method for generating a response to an aggregate query request on a source database, a random sample of records is extracted from the source database to generate a sample database. Then an aggregate query is performed on the sample database to generate a sample result, and an estimate of the aggregate query request on the source database is derived from the sample result.

22 Claims, 3 Drawing Sheets

|     | 42      | 44      | 46        | 48         |
|-----|---------|---------|-----------|------------|
|     | RID     | cust_no | cust_name | cust_state |
|     | 1       | 1001    |           | CA         |
|     | 2       | 1002    |           | PA         |
|     | 3       | 1003    |           | CA         |
|     | 4       | 1004    |           | AZ         |
|     | ⋮       | ⋮       | ⋮         | ⋮          |
|     |         |         |           |            |

*FIG. 3A*

| RID | trans_no | trans_date | trans_amout | cust_no |
|-----|----------|------------|-------------|---------|
| 1   | 1001     | 1/2/97     | $50.00      | 1140    |
| 2   | 1002     | 1/2/97     | $15.00      | 1320    |
| 3   | 1003     | 1/2/97     | $60.00      | 1841    |
| 4   | 1004     | 1/3/97     | $110.00     | 1326    |
| 5   | 1005     | 1/4/97     | $450.00     | 1698    |
| 6   | 1006     | 1/4/97     | $35.00      | 1320    |
| 7   | 1007     | 1/5/97     | $225.00     | 1875    |
| 8   | 1008     | 1/7/97     | $50.00      | 1078    |
| 9   | 1009     | 1/7/97     | $65.00      | 1086    |
| 10  | 1010     | 1/8/97     | $125.00     | 1015    |
| ⋮   | ⋮        | ⋮          | ⋮           | ⋮       |
| F   |          |            |             |         |

| 52' | 54' | 56' | 58' | 44 |
|---|---|---|---|---|
| RID | trans_no | trans_date | trans_amout | cust_no |
| 1 | 1002 | 1/2/97 | $15.00 | 1320 |
| 2 | 1005 | 1/4/97 | $450.00 | 1698 |
| 3 | 1009 | 1/7/97 | $65.00 | 1086 |
| ⋮ | ⋮ | ⋮ | ⋮ | ⋮ |
| N | | | | |

FIG. 5

METHOD AND APPARATUS FOR PERFORMING AN AGGREGATE QUERY IN A DATABASE SYSTEM

BACKGROUND

The present invention relates generally to database systems, and more particularly to aggregate queries in database systems.

A database is a collection of information. Relational databases are typically illustrated as one or more two-dimensional tables. Each table arranges items and attributes of the items in rows and columns. Each table row corresponds to an item (referred to as a record), and each table column corresponds to an attribute of the item (referred to as a field). In a relational database a collection of tables can be related (or "joined") to each other through a common attribute or "key". The common key enables information in one table to be automatically cross-referenced to corresponding information in another table.

A complex search may be performed on a database with a "query". A query specifies a set of criteria (e.g., the names of customers from a particular state) to define information for a database program to retrieve from the database. An aggregate query is a query which requests information concerning a group of records in the aggregate. For example, in a database which stores credit card transactions, an aggregate query may request the total purchases for all customers in a particular state. Each aggregate query may include a set of criteria to select records (e.g., grouping by state), and an operation to perform on the group of selected records (e.g., summing the transaction amounts).

Typical operations for aggregate queries include counting (e.g., determining the total number of transactions in a particular state), summing (e.g., determining the total of the purchases within the state), averaging (e.g., determining the average value of all purchases within the state), and finding minimum and maximum values (e.g., finding the largest and smallest purchases within the state).

To perform an aggregate query, a conventional database program examines every record in the database to determine whether or not the record matches any criteria. It constructs a query table from the records that match the criteria. Then the program performs the required operation over the appropriate fields from each record in the query table.

In some circumstances, a conventional database program may be unacceptably slow when performing an aggregate query. For example, a data warehouse for a credit card company might include a record of every transaction for every customer for the entire history of the credit card company. In such a data warehouse it would require an impractical amount of time or processing power to perform an aggregate query.

Several techniques have been developed to reduce the time required to process aggregate queries. One technique is to pre-compute partial answers to related queries. For example, a transaction total may be pre-computed in each individual zip code. Then, if the user requests the transaction total for a specific state, the database program adds the pre-computed transaction total for each zip code within the specific state. Because there are fewer zip codes than transactions, the transaction totals for the zip code may be added together more quickly than the transaction amount in the transaction records. Unfortunately, the advantages of this technique may be lost if the user submits a query to which no partial answer has been prepared.

SUMMARY OF THE INVENTION

In general, in one aspect, the invention is directed to a computer-implemented method for generating a response to an aggregate query request on a source database. A random sample of records is selected from the source database. Then an aggregate query is performed on the sample to generate a sample result, and an estimate of the aggregate query request on the source database is derived from the sample result.

Implementations of the invention may include the following. One or more sample databases may be generated from the random sample of records. The sample databases may be generated prior to receipt of the aggregate query request, and one of the sample databases may be selected by a user. The aggregate query request on the sample database may include one or more operations selected from the group consisting of count, sum, average, minimum, and maximum. If the aggregate query request includes a count or sum operation, the estimate may be equal to the sample result multiplied by F and divided by N, where F is the number of records in the source database and N is the number of records in the sample database. If the aggregate query request includes an average, minimum or maximum operation, the estimate may be equal to the sample result. A statistic, including a confidence interval and a measure of a certainty in the confidence interval, may be derived to quantify the quality of the estimate. The measure may be received from a user. A margin of error for the estimate may be a function of a confidence level, a standard deviation, and the number of records in the sample database fitting any selection criteria in the aggregate query request. The standard deviation may be $$\sigma = \sqrt{\frac{\text{sum}(a^2)}{\text{count}()} - \frac{\text{sum}(a) \cdot \text{sum}(a)}{\text{count}()(\text{count}() + 1)}}$$

where sum(a) is a sum of a field from records in the sample database fitting any selection criteria in the aggregate query request.

Among the advantages of the invention are the following. The aggregate query may be performed quickly and accurately. The level of accuracy of the query may be determined by a user.

Additional advantages of the invention will be set forth in the description which follows, and in part will be obvious from the description, or may be learned by practice of the invention. Advantages of the invention may be realized and obtained by means of the instrumentality and combinations particularly pointed out in the claims.

BRIEF DESCRIPTION OF THE DRAWINGS

The accompanying drawings, which are incorporated and constitute a part of the specification, schematically illustrate the invention and, together with the general description given above and the detailed description given below, serve to explain the principle of the invention.

DETAILED DESCRIPTION

The present invention relates to an aggregate query on a source database. Initially, a computer system is programmed to create a sample database containing a limited number of records from the source database. When this has been done, a computer may perform an aggregate query on the sample database, and uses statistical analysis to quickly generate an answer to the aggregate query that is an estimate based on the sample database.

Figure 1:
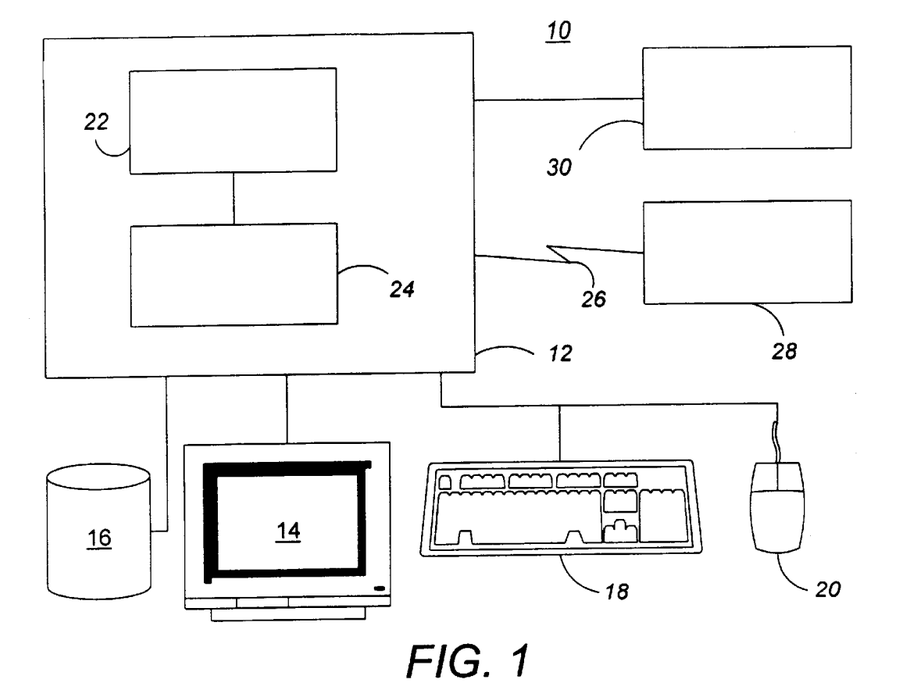
FIG. 1 illustrates a general purpose computer system programmable in accordance with the invention and including a relational database.

Referring to FIG. 1, a general purpose computer system 10 runs programs enabling a user to view and perform aggregate queries on data in a database. The computer system 10 includes a digital computer 12 (such as a personal computer or a workstation), a display 14, a mass storage device 16 (such as a floppy-disk drive, a hard-disk drive, a CD-ROM drive, or a magneto-optical disk drive), a keyboard 18, and a mouse 20 or other pointer device (such as an input tablet). The computer 12 is of conventional construction and includes a memory 22, a microprocessor 24, and other customary components, such as a memory bus and a peripheral bus (not shown). The computer 12 also includes communications hardware and programs (not shown) by which the computer system 10 may be connected over a communications link 26 to other computers 28 to form a computer network.

The computer system 10 includes a database 30 for storing and processing data. The database 30 may be centralized on a single computer, or it may be distributed across the computer network. Typically, the database 30 will be managed by a database management system (not shown) running on a computer linked to the database, either permanently or transiently. In the particular example implementation described below, the database 30 stores information for a credit card company. However, the invention is applicable to any sort of database.

Figure 2:
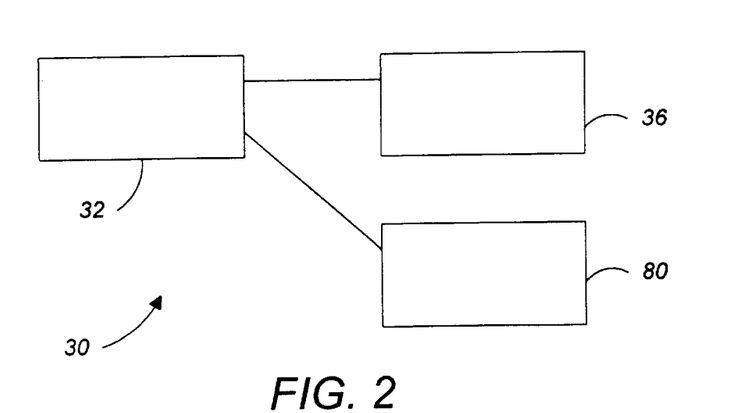
FIG. 2 illustrates a relational database in accordance with the invention.

Referring to FIG. 2, the database 30 is a relational database with a customer table 32 and a transaction table 36. In addition, the relational database 30 includes a sample table 80 (discussed below with reference to FIG. 5). The database 30 may also include other resources, such as rules for interacting and manipulating objects, index tables, and interpreters to execute query requests (not shown).

Figure 3A:
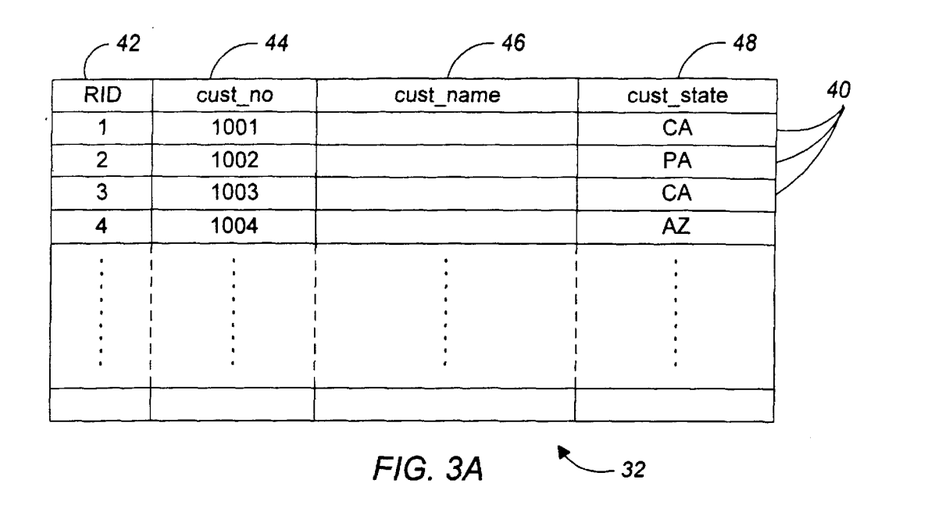
FIGS. 3A and 3B illustrate tables of the relational database of FIG. 2.

Referring to FIG. 3A, the customer table (cust_table) 32 includes a record 40 for each customer. Each record 40 includes a record identifier (RID) 42, a customer number field (cust_no) 44, a customer name field (cust_name) 46, and one or more customer address fields, including a customer state field (cust_state) 48. The customer table 32 may include other fields as well.

Figure 3B:
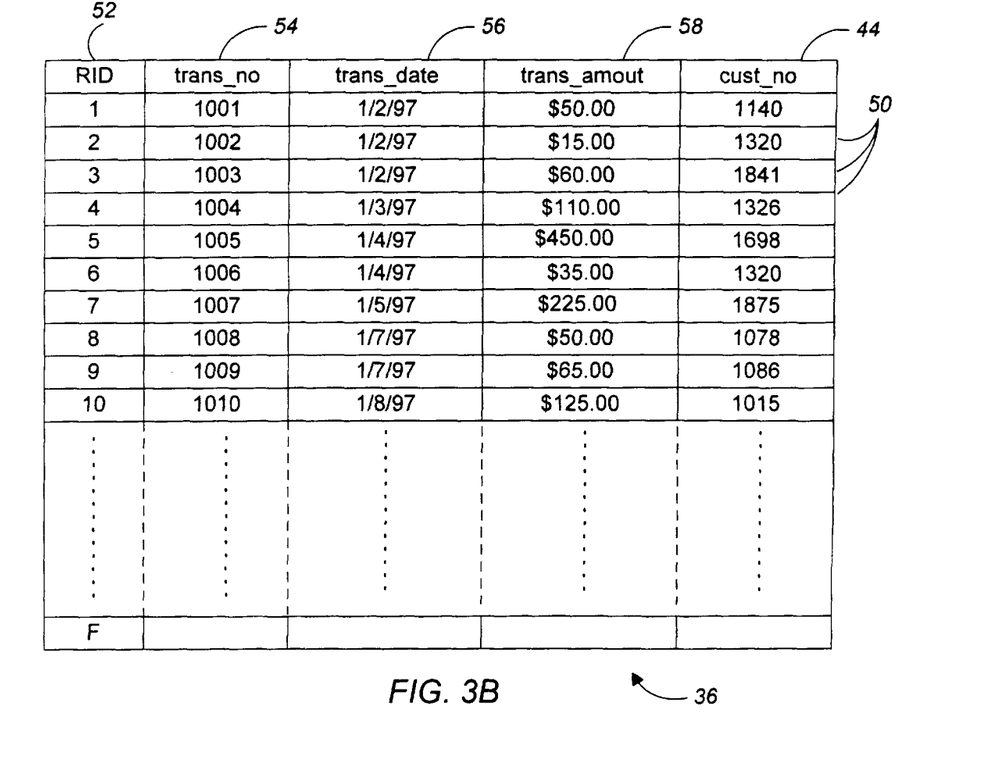

Referring to FIG. 3B, the transaction table (trans_table) 36 includes a record 50 for each credit card transaction. Each record 50 includes a record identifier (RID) 52, a transaction number field (trans_no) 54, a transaction date field (trans_date) 56, a transaction amount field (trans_amount) 58, and the customer number field (cust_no) 44. The customer number field 44 is a key that links the transaction table 36 to the customer table by matching each transaction to a particular customer. The transaction table 36 may include other fields to identify the vendor and the type of transaction (e.g., a purchase, a payment, or a cash advance), but these fields are not shown.

Returning to FIG. 2, a user (a human or a program) may submit a query to retrieve information from the database 30. For example, the user may query the database 30 to count all the transactions for customers from a particular state. Because the customer table 32 can be joined with the transaction table 36, the information about the customer can readily be determined for each record in the transaction table.

Figure 4:
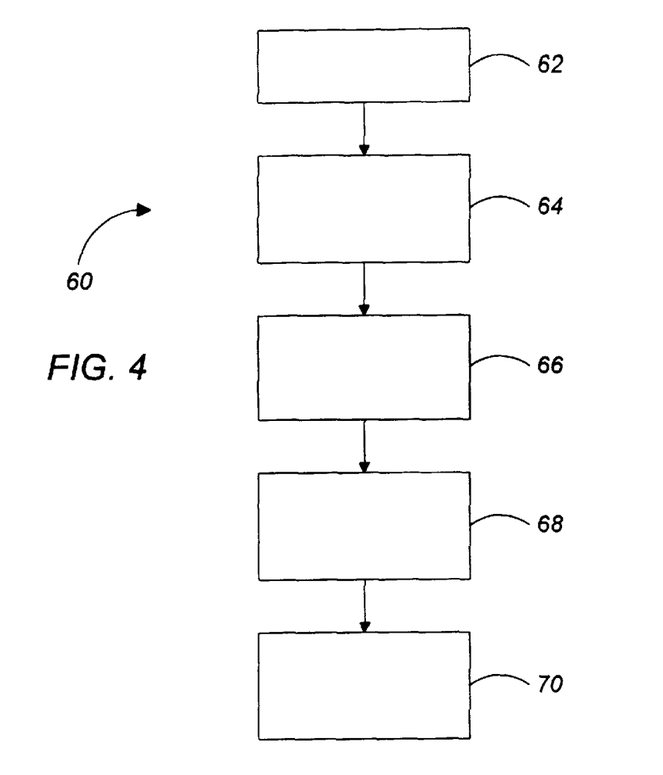
FIG. 4 is a flow diagram of a method of performing an aggregate query in accordance with the present invention.

Referring to FIG. 4, in a method 60 of performing an aggregate query on a database, a computer system preliminarily selects a sample from a source database (step 62). Then a computer system (not necessarily the same one as performed the extraction) receives a request for an aggregate query on the source database (step 64). The aggregate query is performed on the sample to generate a sample result (step 66) and, from the sample result, an estimated response R to the request for the aggregate query the source database is derived (step 68). The computer system calculates a margin of error (E) at a given confidence level (Z) for the estimate (step 70). Finally, the computer system may display the result, for example, in the format R±E (with confidence Z). Each of the steps in the method 60 will be described in more detail below.

Figure 5:
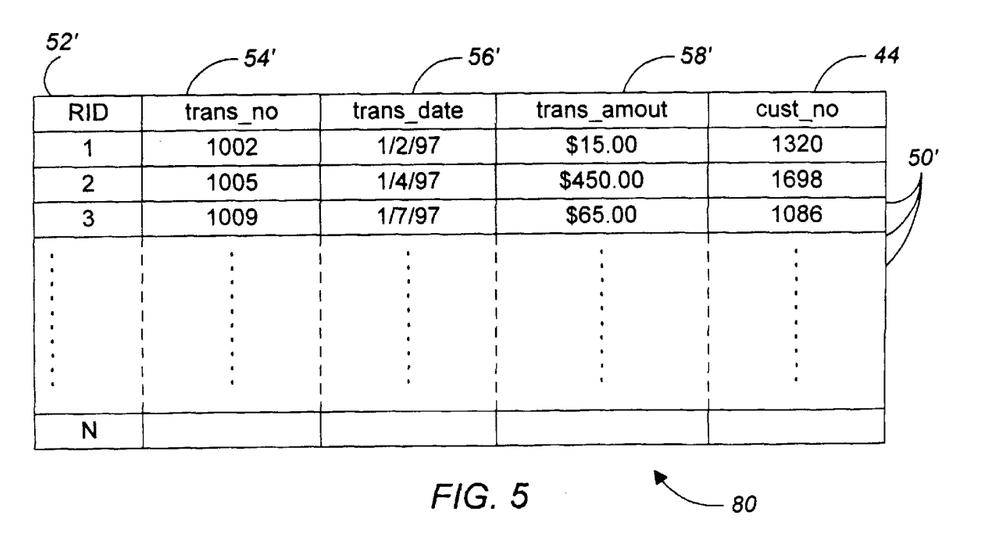
FIG. 5 illustrates a sample table generated in the method shown by FIG. 4.

Referring to FIG. 5, the sample table 80 is extracted from the transaction table (which is the "source table" in this example) in step 62. The sample table 80 is generated by selecting records from the source table randomly to provide a substantially valid statistical sample. The selection of records from the source table is conducted without replacement so that the same record is not selected twice. In general, a pseudo-random algorithm may be used to select records from the source table. For example, if the source table has F records and the sample table will have N records, then the source table may be broken into N/S groups of records, and one record may be randomly selected from each group. In general, a database administrator would create the sample table 80 before the database is made available to users.

The sample table 80 includes the same fields (RID 52', trans_no 54', trans_date 56', trans_amount 58', and cust_no 44) as the source table but may have far fewer records 50'. The customer number field (cust_no) 44 provides a link to the customer table 32 (see FIG. 2).

The number of records in the sample table 80 depends upon the nature of the expected aggregate query and desired accuracy of the estimated result. A sample table 80 containing a large number of records 50' will provide an accurate estimation. In a data warehouse environment, the sample table 80 may include about one to ten percent of the records in the source table. A sample table 80 with fewer records will provide a less accurate estimation, but may be used to perform the aggregate query more quickly. Several sample tables of different sizes may be generated. The user may then select a sample table of a desired size at the time the aggregate query is made. This permits the user to balance accuracy against speed.

Returning to FIG. 4, in step 64 the relational database receives an aggregate query on the source table. The aggregate query may be generated by a user command having the following format:

SELECT <key-list>, <operation (a)>
FROM <table-list>
[WHERE <condition-list-1>]
[GROUP BY <key-list>]
[HAVING <condition-list-2>]

Where the parameters are as follows:

key-list: Identifies the field or fields from the source table on which the records will be grouped.

operation: Identifies a mathematical operation to be performed on the group or groups of records specified by the query. The operation may be a general function, such as a compound expression including aggregate and non-aggregate operations and constants.

a: Identifies one or more fields from the source table on which the operation will be performed.

table-list: Identifies the source table being queried and any other tables to be joined to the source table.

condition-list-1: Includes zero or more criteria to be satisfied for a record to be included in the query and/or for tables to be joined to the source table.

condition-list-2: Includes zero or more criteria for the aggregate group to be displayed in the query.

Permissible aggregate operations include:

COUNT ( ): count the number of records which match the selection criteria

SUM(a): sum the values in the field for each record that matches the selection criteria AVG(a): find the average value of the field for the records that match selection criteria MAX(a): find the maximum value of the field in the records that match selection criteria MIN(a): find the minimum value of the field in the records that match the selection criteria In the discussions and equations that follow, a request for an aggregate query on the source table will be shown in upper case (e.g., SUM(a)), whereas an aggregate query performed on the sample table will be shown in lower case (e.g., sum(a)). A request for an estimated aggregate query will be indicated with an asterisk (e.g., SUM*(a)).

An aggregate query to determine the estimated number of transactions on each day would be created by a statement such as:

SELECT trans_date, COUNT*( )
FROM trans_table
GROUP BY trans_date

An aggregate query to determine the estimated sum, grouped by state, of the transaction amounts for all customers would be created by a statement such as:

SELECT cust_state, SUM*(trans_amount)
FROM cust_table, trans_table
WHERE cust_table.cust_no=sample_table.cust_no
GROUP BY cust_state When the database receives a request for an aggregate query, the computer system may interpret it as a request for an estimated result rather than a request for an exact result. Alternatively, the user may specifically request an estimated result, or the computer system may have a default which interprets any aggregate query request as a request for an estimated aggregate query.

In step 66, an aggregate query is performed on the sample table. This aggregate query is of the same kind that the user has requested for the source table. For example, if the requested aggregate operation is SUM*(a) then a sum(a) operation will carried out on the sample table. Some of the operations on the sample table may be performed by combining other operations. For example, the sum operation may be calculated by performing an average operation and a count operation and multiplying the results. The aggregate query on the sample table may be performed according to methods known in the art, and will not be further discussed.

In step 68, an estimated result for the aggregate query on the source table is derived from the aggregate query on the sample table. The estimated results of the average, maximum, and minimum query operations are equal to the same aggregate queries carried out on the sample table. The estimated results of the count and sum query operations are calculated by multiplying the results of the aggregate query on the sample table by a scaling factor. The scaling factor is equal to the number of records (F) in the source table divided by the number of records (N) in the sample table. These calculations are summarized below:

COUNT*(a)=count( )*F/N
SUM*(a)=sum(a)*F/N
AVG*(a)=avg(a)
MAX*(a)=max(a)
MIN*(a)=min(a)

In step 70, margin of error (E) is calculated for the estimated result of the aggregate query on the source table. The margin of error (equal to one-half the confidence interval) is calculated for a given confidence level (Z). The formulas to calculate the estimated result (R) and the margin of error (E) for each of the aggregate query operations is given in the table below:

| Query | Estimated Result (R) | Margin of Error (E) |
|---|---|---|
| COUNT* () | $\text{count}() \frac{F}{N}$ | $\frac{zF}{\sqrt{N}} \sqrt{\frac{\text{count}()}{N} - \frac{\text{count}^2()}{N^2}}$ |
| SUM* (a) | $\text{avg}(a) \cdot \text{count}() \frac{F}{N}$ | $\frac{z\sigma F \sqrt{\text{count}()}}{N}$ |
| AVG* (a) | avg (a) | $\frac{z\sigma}{\sqrt{\text{count}()}}$ |
| MAX* (a) | max (a) | $\frac{2z\sigma}{\sqrt{\text{count}()}}$ |
| MIN* (a) | min (a) | $\frac{2z\sigma}{\sqrt{\text{count}()}}$ |

F is the number of records in the source table, N is the number of records in the sample table 80, $\sigma$ is a modified standard deviation, and z is the confidence level expressed as standard deviations.

The confidence level indicates probability that the actual result falls within the margin of error of the estimated result. In general, the higher the confidence level, the wider the margin of error must be. To calculate the margin of error, the confidence level Z (expressed by the user as a percentile likelihood that the correct answer falls within the margin of error) is converted into a corresponding confidence level z (expressed as a number of standard deviations). The exact relation between z and Z is given by the following formula:

$$Z = \int_{-z}^{+z} \frac{1}{\sqrt{2}} e^{\frac{1}{2} t^2} dt$$

A solution to this equation may be approximated by the following algorithm:

If Z<=0. 5 then z=1.36*Z

If 0.5<Z<=0.68 then z=0.68+[1.84*(Z−0.5)]

If 0.68<Z<=0.9 then z=1.14+[3.40*(Z−0.68)]

If 0.9<Z<=0.95 then z=1.65+[6.20*(Z−0.9)]

If 0.95<Z<=0.97 then z=1.96+[10.5*(Z−0.95)]

If 0.97<Z<=0.98 then z=2.17+[16.0*(Z−0.97)]

If 0.98<Z<=0.99 then z=2.33+[25.0*(Z−0.98)]

If 0.99<Z<=0.995 then z=2.58+[46.0*(Z−0.99)]

If 0.995<Z then z=3

Several specific values for Z and z are given in the table below:

$$\sigma = \sqrt{\frac{sum(a^2)}{count()} - \frac{sum(a) \cdot sum(a)}{count()(count() + 1)}}$$

A modified standard deviation σ is calculated according to the following formula:

$$\sigma = \sqrt{\frac{sum(a^2)}{count()} - \frac{sum(a) \cdot sum(a)}{count()(count() + 1)}}$$

This modified standard deviation σ compensates for certain difficulties in the traditional standard deviation calculations. For example, the traditional standard deviation calculation produces useless answers if only one record in the sample table matches the selection criteria or if all of the records matching the selection criteria contain the same value.

The database program can also provide a response for an aggregate query with a compound expression. The formulas to calculate an estimate of a compound expression and the corresponding margin of error are given in the table below:

| Compound Expression | Estimation | Margin of Error |
|---|---|---|
| x + y | x + y | a + b |
| x − y | x − y | \|a − b\| |
| x * y | x * y | \|bx\| + \|ay\| |
| x / y | x / y | \| (\|a/y\| − \|bx/y$^2$\|) \| |

The value x has a margin of error of a and the value y has a margin of error b. If the compound expression includes a constant, then the estimated value of the constant is equal to the constant and the margin of error will be zero.

In the embodiment described above, the sample table is generated prior to the receipt of the aggregate query by the database program. However, in another embodiment, the computer system may generate the sample table after the query has been received. In yet another embodiment, the computer system may select and operate on random records from the source table without creating a sample table.

Various update methods exist and may be adapted to the sample table. One embodiment reconstructs the sample table when any of the reference fields from the source table are altered, or deletes the sample table if the alteration is incompatible with the sample table (e.g., if a field is deleted). This update method is particularly suitable for data warehousing environments, in which data is not frequently updated.

While the invention is described in terms of a software implementation, the invention may be implemented in software or hardware or firmware, or a combination of the three.

The present invention has been described in terms of an embodiment. The invention, however, is not limited to the embodiment depicted and described. Rather, the scope of the invention is defined by the appended claims.

What is claimed is:

1. A computer-implemented method for generating a response to an aggregate query request on a source database, comprising:
    selecting a random sample of a plurality of records in the source database;
    performing an aggregate query on each sample to generate a sample result; and
    deriving an estimated response to the aggregate query request from the sample result.

2. The method of claim 1 wherein the aggregate query request on the sample includes an operation selected from the group consisting of count, sum, average, minimum, and maximum.

3. The method of claim 2 wherein the source database has a number of records F, the sample has a number of records N, the aggregate query request includes an operation selected from the group consisting of count and sum, and the estimate is equal to the sample result multiplied by F and divided by N.

4. The method of claim 2 wherein the aggregate query request includes an operation selected from the group consisting of average, minimum and maximum, and wherein the estimate is equal to the sample result.

5. The method of claim 1 further comprising deriving a statistic quantifying the quality of the estimate.

6. The method of claim 5 wherein the statistic includes a confidence interval.

7. The method of claim 6 wherein the statistic includes a measure of a certainty in the confidence interval.

8. The method of claim 7 further comprising receiving the measure of certainty from a user.

9. The method of claim 5 wherein the statistic includes a margin of error for the estimate.

10. The method of claim 9 wherein the margin of error is a function of z and count ( ), where z is a confidence level and count ( ) is the number of records in the sample fitting any selection criteria in the aggregate query request.

11. The method of claim 10 wherein the aggregate query request includes a count operation and the margin of error for the count operation is $$\frac{z}{\sqrt{N}} \sqrt{\frac{count()}{N} - \frac{count^2()}{N^2}} F$$

12. The method of claim 9 wherein the margin of error is a function of z, σ, and count ( ), where z is a confidence level, σ is a standard deviation, and count ( ) is the number of records in the sample fitting any selection criteria in the aggregate query request.

13. The method of claim 12 wherein $$\sigma = \sqrt{\frac{sum(a^2)}{count()} - \frac{sum(a) \cdot sum(a)}{count()(count() + 1)}}$$

where sum(a) is a sum of a field from records in the sample fitting any selection criteria in the aggregate query request.

14. The method of claim 12 wherein the aggregate query request includes a sum operation and the margin of error of the sum operation is $$\frac{z\sigma F \sqrt{count()}}{N}$$

15. The method of claim 12 wherein the aggregate query request includes an average operation and the margin of error of the average operation is $$\frac{z\sigma}{\sqrt{count()}}$$

16. The method of claim 12 wherein the aggregate query request includes a maximum operation and the margin of error of the maximum operation is $$\frac{2z\sigma}{\sqrt{\text{count()}}}$$

17. The method of claim 12 wherein the aggregate query request includes a minimum operation and the margin of error of the minimum operation is $$\frac{2z\sigma}{\sqrt{\text{count()}}}$$

18. The method of claim 5 wherein the aggregate query request includes a compound expression and the method further comprises deriving a statistic quantifying the quality of the estimate of the compound expression.

19. The method of claim 1 further comprising generating a sample database from the selected records.

20. The method of claim 19 wherein the sample database is generated prior to a receipt of the aggregate query request.

21. A computer-implemented method for generating a response to an aggregate query request on a source database, comprising:

extracting a plurality of random samples of records from the source database to generate a plurality of sample databases;

receiving a user input to select one of the plurality of sample databases;

performing an aggregate query on the selected one of the plurality of sample databases to generate a sample result; and deriving an estimated response to the aggregate query request from the sample result.

22. A computer program for generating a response to an aggregate query request on a source database, the computer program tangibly stored on a computer-readable medium, comprising instructions for causing a computer to:

select a random sample of a plurality of records in the source database;

perform an aggregate query on the sample to generate a sample result; and derive an estimated response to the aggregate query request from the sample result.

* * * * *

UNITED STATES PATENT AND TRADEMARK OFFICE
CERTIFICATE OF CORRECTION

| | | |
|---|---|---|
| PATENT NO. | : 5,893,090 | Page 1 of 3 |
| DATED | : 4/6/99 | |
| INVENTOR(S) | : Friedman et al. | |

It is certified that error appears in the above-identified patent and that said Letters Patent is hereby corrected as shown below:

In the drawings, please substitute Figs. 1, 2 and 4 with attached Figs. 1, 2 and 4.

Signed and Sealed this

Twelfth Day of October, 1999

Attest:

Q. TODD DICKINSON

*Attesting Officer*     *Acting Commissioner of Patents and Trademarks*